(12) United States Patent
Pulikkottil et al.

(10) Patent No.: US 6,761,918 B2
(45) Date of Patent: Jul. 13, 2004

(54) METHOD OF PROCESSING GREEN TEA LEAVES TO PRODUCE BLACK TEA THAT CAN BE BREWED IN COLD WATER

(75) Inventors: Jose David Pulikkottil, Kerala (IN); Ramakrishna Palacharla, Kakinada (IN); Bhardwaj Ashok, Uttaranchal (IN); Ravi Sankararaman, Chennai (IN)

(73) Assignee: Tata Tea Ltd. (IN)

( * ) Notice: Subject to any disclaimer, the term of this patent is extended or adjusted under 35 U.S.C. 154(b) by 18 days.

(21) Appl. No.: 10/198,645

(22) Filed: Jul. 18, 2002

(65) Prior Publication Data

US 2004/0018273 A1 Jan. 29, 2004

(51) Int. Cl.⁷ .............................. A23F 3/06; A23F 3/08; A23F 3/12
(52) U.S. Cl. ......................................... 426/49; 426/597
(58) Field of Search .................................. 426/597, 49

(56) References Cited

U.S. PATENT DOCUMENTS

| | | |
|---|---|---|
| 2,022,467 A | 11/1935 | Heyman |
| 2,110,732 A | 3/1938 | Kane |
| 2,863,775 A | 12/1958 | Perech |
| 3,065,007 A | 11/1962 | Mishkin et al. |
| 3,117,004 A | 1/1964 | McFarlane |
| 3,151,985 A | 10/1964 | Fobes |
| 3,163,539 A | 12/1964 | Barch |
| 3,445,236 A | 5/1969 | Gurkin |
| 3,787,590 A | 1/1974 | Borders |
| 3,809,769 A | 5/1974 | Rivkowich |
| 3,812,266 A | 5/1974 | Sanderson et al. |
| 3,914,439 A | 10/1975 | Graves |
| 3,950,553 A | 4/1976 | Gasser et al. |
| 3,959,497 A | 5/1976 | Takino |
| 4,004,038 A | 1/1977 | Wickremasinghe |
| 4,051,264 A | 9/1977 | Sanderson et al. |
| 4,076,847 A | 2/1978 | Johnson et al. |
| 4,135,001 A | 1/1979 | Edmonds et al. |
| 4,156,024 A | 5/1979 | Husaini |
| 4,357,361 A | 11/1982 | Lunder et al. |
| 4,472,441 A | 9/1984 | Clark et al. |
| 4,478,939 A | 10/1984 | Adler-Nissen et al. |
| 4,483,876 A | 11/1984 | Petersen |
| 4,490,402 A | 12/1984 | Lunder et al. |
| 4,534,983 A | 8/1985 | Koene et al. |
| 4,639,375 A | 1/1987 | Tsai |
| 4,680,193 A | 7/1987 | Lunder et al. |
| 4,826,695 A | 5/1989 | Tanner |
| 4,880,649 A | 11/1989 | Holzner et al. |
| 5,094,860 A | 3/1992 | Newhall et al. |
| 5,318,791 A | 6/1994 | Millman et al. |
| 5,554,400 A | 9/1996 | Stipp |
| 5,863,581 A * | 1/1999 | Barrett et al. |
| 6,113,965 A | 9/2000 | Goodsall et al. |
| 6,235,323 B1 | 5/2001 | Carns et al. |
| 6,254,902 B1 | 7/2001 | Hodges et al. |
| 6,296,887 B1 | 10/2001 | Mehta et al. |
| 6,432,467 B1 * | 8/2002 | Blair et al. |
| 6,482,450 B1 * | 11/2002 | Goodsall et al. |
| 6,491,961 B1 * | 12/2002 | Balentine et al. |
| 2001/0033880 A1 | 10/2001 | Genesan et al. |

FOREIGN PATENT DOCUMENTS

| | | |
|---|---|---|
| EP | 6616898 | 11/1966 |
| EP | 3701230 | 1/1987 |
| EP | 760213 | 3/1997 |
| EP | 0910956 | 10/1998 |
| FR | 2.190.372 | 6/1973 |

(List continued on next page.)

Primary Examiner—Anthony Weier
(74) Attorney, Agent, or Firm—Holland & Knight LLP (57) ABSTRACT

Included is a method of processing green tea leaves to produce black tea particles which can be brewed in Cold Water. The method also is designed to produce cold water brewing tea of a suitable size and grade for use within a tea bag. The method also is designed to produce high polyphenol cold brew tea or conventional tea of any suitable size and grade. Thus, by way of the method of the present invention, a black tea is produced that can be brewed in cold water and further which can be used in tea bags. This is achieved without sacrificing any color quality or taste.

13 Claims, 6 Drawing Sheets

FOREIGN PATENT DOCUMENTS

| | | |
|---|---|---|
| FR | 2.268.518 | 4/1974 |
| GB | 29891 | of 1911 |
| GB | 940867 | 10/1958 |
| GB | 1249932 | 7/1969 |
| GB | 1311255 | 6/1971 |
| GB | 1380135 | 2/1972 |
| GB | 1428394 | 6/1972 |
| GB | 1413351 | 1/1973 |
| GB | 1461726 | 6/1975 |
| GB | 1546508 | 3/1976 |
| GB | 2074838 | 2/1981 |
| GB | 2095968 | 3/1982 |
| GB | 2208096 | 1/1988 |
| JP | 1251079 | 10/1968 |
| JP | 1-296941 | 5/1988 |
| JP | 4-44714 | 6/1990 |
| JP | 07067530 | 9/1993 |
| JP | 8-70771 | 9/1994 |
| JP | 11221018 | 10/1998 |
| SU | 1102554 | 11/1982 |
| WO | WO 97/40699 | 11/1997 |

* cited by examiner

| MATERIAL | QUANTITY (KG) | MOISTURE CONTENT (%) | DRY MATTER (KG) |
|---|---|---|---|
| GREEN LEAF | 500 | 77.00 | 115 |
| WITHERED LEAF | 316 | 63.61 | 115 |
| CLASSIFICATION | PF/PD Grades 95    Others 221 | 63.61 | 34.57    80.43 |
| INSTANT TEA EXTRACT ADDITION (3.5 kg As 32% w/v) | 106 | 64.08 | 38.07 |
| COLD BREW TEA | 39 | 2.00 | 38.07 |
| BLACK TEA | 82 | 2.00 | 80.43 |

Comparison : Various Quality Parameters

| Temp | Temp | Theaflavins % | Thearubigins % | Total Color | Brightness % | Total soluble solids, % |
|---|---|---|---|---|---|---|
| 5° C | CB Tea | 0.124 | 1.31 | 1.54 | 4.15 | 12.91 |
|  | Market Sample 1 | 0.122 | 1.24 | 1.32 | 4.16 | 10.29 |
|  | Market Sample 2 | 0.024 | 0.99 | 0.30 | 6.25 | 8.91 |
| 10° C | CB Tea | 0.140 | 4.26 | 1.73 | 4.81 | 15.56 |
|  | Market Sample 1 | 0.142 | 4.16 | 1.65 | 4.72 | 13.38 |
|  | Market Sample 2 | 0.034 | 0.94 | 0.42 | 7.11 | 11.93 |
| 25° C | CB Tea | 0.164 | 5.27 | 2.06 | 8.72 | 24.95 |
|  | Market Sample 1 | 0.151 | 5.32 | 2.09 | 7.14 | 19.25 |
|  | Market Sample 2 | 0.058 | 2.86 | 0.68 | 9.88 | 15.79 |

FIG. 6

Comparison : Brewing Characteristics

| Grade | Temp ° C | Total Soluble Solids, % | Abs at 560 nm |
|---|---|---|---|
| CB Tea (PF grade) | 5 | 12.91 | 0.186 |
|  | 10 | 15.56 | 0.289 |
|  | 25 | 24.95 | 0.416 |
| Market Sample1 | 5 | 10.29 | 0.175 |
|  | 10 | 13.38 | 0.269 |
|  | 25 | 19.25 | 0.425 |

FIG. 7

Comparison : Color Characters

| Parameter | Sample | Brewing Time | | | |
|---|---|---|---|---|---|
| | | 2 Min | 3 Min | 4 Min | 5 Min |
| Color (Absorbance at 560nm) | CB Tea | 0.111 | 0.129 | 0.128 | 0.137 |
| | Market Sample | 0.085 | 0.100 | 0.117 | 0.114 |
| Clarity (NTU* | CB Tea | 5 | 6 | 6 | 4 |
| | Market Sample | 4 | 3 | 4 | 3 |

* Nephelometric Turbidity Units

FIG. 8

Shelf Life Studies

| Temp °C | Days | TF, % | TR, % | TC | B, % | TSS, % | Abs (560nm) |
|---|---|---|---|---|---|---|---|
| 25° C | 0 | 0.164 | 5.27 | 2.06 | 8.72 | 24.95 | 0.416 |
| | 90 | 0.146 | 3.84 | 2.03 | 7.62 | 24.81 | 0.399 |
| | 200 | 0.147 | 3.51 | 2.01 | 7.09 | 24.53 | 0.347 |
| 10° C | 0 | 0.140 | 4.26 | 1.73 | 4.81 | 15.56 | 0.289 |
| | 90 | 0.095 | 3.87 | 1.27 | 3.92 | 15.63 | 0.257 |
| | 200 | 0.050 | 3.59 | 0.89 | 2.90 | 15.51 | 0.191 |
| 5° C | 0 | 0.124 | 1.31 | 1.54 | 4.15 | 12.91 | 0.186 |
| | 90 | 0.096 | 1.27 | 1.36 | 3.42 | 12.81 | 0.179 |
| | 200 | 0.062 | 1.24 | 1.21 | 2.48 | 12.44 | 0.133 |

FIG. 9

METHOD OF PROCESSING GREEN TEA LEAVES TO PRODUCE BLACK TEA THAT CAN BE BREWED IN COLD WATER

BACKGROUND OF THE INVENTION

1. Field of the Invention

This invention relates to a method of processing green tea leaves. More particularly, the present invention relates to a method of processing green tea leaves to produce Black Tea that can be brewed in cold water. The method is also designed to produce tea that can be brewed in cold water and of a suitable size and grade for use within a tea bag. The method also is designed to produce high polyphenol Black Tea that can be brewed in cold water or conventional hot tea of any suitable size and grade.

2. Description of the Background Art

Tea is the most widely consumed beverage in the world. Most tea beverages are brewed from black tea. Black tea is manufactured by processing plucked green tea leaves. This process typically includes withering, maceration, fermentation, and drying operations. The manufacturing process results in black tea particles of varying sizes, which are sieved into grades according to their sizes and market requirement. Tea of various grades and sources are blended to get required taste and packed bulk in Tea Bag.

The manufacturing process, however, results in a marked reduction in the content of water solubles within the tea leaves. The reduction, in turn, results in part of the green leaf soluble components becoming insoluble. It is believed that the insoluble components are the result of polymeric substances formed by enzyme oxidation occurring during the fermentation step. More specifically, during fermentation, colorless green leaf polyphenols (or catechins) undergo endogenous enzyme mediated oxidation to produce colored polyphenols called Theaflavins (TFs) and Thearubigins (TRs). These colored polyphenols are responsible for the colors characteristic to black tea and its liquor. The insolubles created during fermentation can be either cold or hot water insoluble. In addition to the insoluble components, there are many compounds present in black tea that are only sparingly soluble in cold water. Many of these partially cold water soluble compounds give tea beverages their unique organoleptical properties. As a result of these insoluble and partially soluble components, when traditional black leaves are brewed in cold water the result is a beverage weak in both color and taste For the reasons stated above, traditionally black teas are usually brewed in hot or boiling water. Namely, the required amount of tea, either loose or in tea bag form, is brewed in boiling water for 2 or 3 minutes, strained and used as a hot beverage. This avoids the problem of cold water insoluble components and also generates a tea beverage of acceptable color and taste.

However, in some regions of the world, especially on the American continent, tea is best enjoyed as a cold beverage, namely iced tea. For example, the hot brewed tea can be refrigerated to achieve an acceptable temperature. Alternatively ice can be added to the hot brewed tea prior to consumption. Yet, both of these options add another step to the process, requiring a substantial amount of additional time.

Another alternative is to brew the tea in cold water for an extended period of time. Yet even with extended brewing times, this option fails to produce a tea with an acceptable strength or color. For this reason conventionally manufactured tea cannot be used for brewing in cold water and similar applications. Still yet another alternative is to use cold water soluble instant tea. These teas typically come in a powder form. Thus, the resulting tea beverage is not brewed, rather it is created by the addition of water. Consequently, these instant teas produce a beverage lacking in flavor and taste, and require the use of additives such as flavor enhancers and or sweeteners. eg. Ready to drink (RTD) beverage or Dry mix.

Over the years attempts have been made to overcome the aforementioned problems and create a tea with improved brewing characteristics. An example of this is presented in Great Britain Patent 1,428,394 to Pendlington. Pendlington provides a process for the preparation of a composite tea product comprising black leaf tea and hot water soluble solids of fermented tea.

Furthermore, U.S. Pat. No. 4,051,264 to Sanderson et al. discloses a process for obtaining a cold water extractable tea leaf. The process involves treating fresh green tea leaves with an enzyme tannase additive to produce dry tea leaves which are cold water extractable.

Both U.S. Pat. No. 6,235,323 to Carns et al, and European Patent Application 910,956 to Carns, disclose a tea bag for iced tea beverages. The tea bag contains a tea mixture of about 30% to about 95% by weight of tea leaves, and about 5% to about 70% by weight of dried soluble tea solids. The resulting bag can be immersed in cold water to provide a tea beverage.

Finally, U.S. Pat. No. 5,863,581 to Barrett discloses a tea manufacturing processes wherein Zeolites are added to green leaf tea and tea powder to improve color properties and speed of color generation. The processes disclose addition of Zeolites prior to extraction and deleafing steps.

Although each of the above described tea processing methods achieves its individual objective, they all suffer from common problems. For example, many of the methods involve the addition of exogenous materials and or enzymes to achieve the desired brewing characteristics. This requires additional time, expense, and processing steps. Additionally, none of the methods involve formulating cold brewing characteristics separate from the fermentation step; that is, any cold brewing characteristics are developed during normal processing operations, thereby lessening the control over such characteristics. Furthermore, none of the above described methods classifies tea particles for selective processing of only those particles suitable for use within a tea bag.

SUMMARY OF THE INVENTION

It is therefore one of the objectives of this invention to provide a method of manufacturing a Black Tea that can be brewed in cold water as bulk tea by adding specially prepared cold water soluble tea extracts during fermentation.

It is also an object of this invention to provide a method of making a Black Tea that can be brewed in cold water wherein only grades suitable for use in tea bags are manufactured.

It is a further object of this invention to achieve tea particle classification during the manufacturing process by way of a system of screens.

Still another object of this invention is to produce a Black Tea that can be brewed in cold water that does not require the use of exogenous materials or enzymes during the manufacturing process.

Still yet another object of this invention is to provide a tea manufacturing process wherein cold brewing characteristics are generated and formed separately and thereafter incorporated into the tea during subsequent processing steps.

It is still yet another object of this invention to provide a tea manufacturing method, which allows normal fermentation of the tea and wherein the addition of an extract solution is carried out during a wet stage such that the extract solution is incorporated into the tea particles by way of absorption.

The foregoing has outlined rather broadly the more pertinent and important features of the present invention in order that the detailed description of the invention that follows may be better understood so that the present contribution to the art can be more fully appreciated. Additional features of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

DETAILED DESCRIPTION OF THE PREFERRED EMBODIMENT

The present invention relates to a method of processing green tea leaves to produce black tea particles that can be brewed in cold water. The method also produces tea particles of a grade and size suitable for use within a tea bag. All of this is achieved without sacrificing any color, quality, or taste. The various steps in the method of the present invention are described more fully hereinafter.

Figure 1:
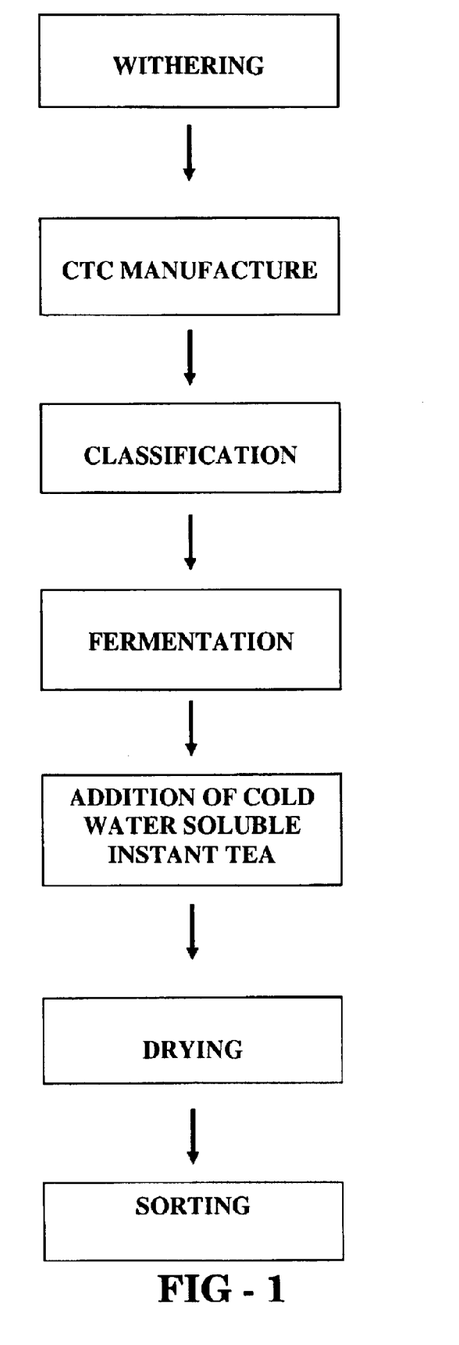
FIG. 1 is a flow chart illustrating the inventive steps of the present invention.

With reference to FIG. 1 the primary steps of the present invention are depicted. These steps include: withering; maceration; classification; fermentation; addition of cold water soluble tea extract; drying; and sorting. Many of these steps, for example maceration and fermentation, are conventional steps in tea manufacturing processes. However, the order of the steps of the present invention and the addition of cold water soluble tea extract produce many of the inventive features of the present invention.

Withering

The first step of the method is withering. This step is carried out on freshly picked green tea leaves; specifically, a mature two or three tea leaf and a bud harvested from the species *Camellia sinensis*. This species covers the Assam type, the China type and all hybrids including Combod varieties. During the withering process these freshly plucked leaves are allowed to lose their moisture. This is achieved by spreading the leaves out in troughs and promoting the circulation of either hot or cold air around the leaves. The leaves are kept in the trough for a time period of between 15 to 18 hours. The exact length of time required for withering is dependent upon the initial moisture of the leaves and the final desired moisture. Longer withering times are required for leaves with higher moisture contents, or if the process requires especially dry leaves. The result of the withering process is flaccid tea leaves. This flaccid state of the leaf is the result of both the physical and chemical effects of the withering process. That is, withering creates both physical changes in the leaf (i.e. loss of moisture) as well as chemical changes in the leaf (i.e. the concentration of cell fluids followed by various reactions). The flaccid nature of the leaf resulting during the withering process is a prerequisite to subsequent processing steps.

Maceration

The next step in the manufacturing process is maceration. Maceration involves the breaking up of cell wall of tea leaves which in turn allows enzymes and polyphenols present within tea leaves separately, to come in contact with each other. These results in an enzyme mediated air oxidation of the polyphenols. Without proper maceration, the biochemical changes during oxidation/fermentation will not be satisfactory and the result will be poor tea quality.

There are two primary methods to achieve maceration. The first is "orthodox manufacture" and involves rolling of the leaves. The second and preferred method for this invention involves the use of a CTC machine. CTC stands for cut, tear and curl and it is achieved by way of a mangle having a series of rollers. Each of the rollers, in turn, has a series of teeth. The withered leaves are passed through series of rollers wherein they are broken up into smaller tea leaf particles called dhools. In the preferred embodiment, the leaves are subjected to three or four cuts in a CTC machine, with the machine being optimized for about 65 to 70% of all leaf grades. However the number of CTC rollers and profile of rollers employed are based on the type of raw material, final type of tea and the grades of tea required.

Classification of Wet Particles to Separate Grades Suitable for Tea Bags

This step permits the classification of wet particles after cutting/maceration into two fractions. One part consists of tea particles mostly suitable for use with a tea bag and is processed separately into cold brew tea. Second fraction is manufactured into conventional black tea.

It has been found that PF, PD and RD grades are the most suitable grades for the tea bag format. Accordingly these grades are selected for processing separately. The classification is achieved through a series of sieves. That is, all of the tea particles produced from the maceration are passed through a two stage reciprocating or rotary sieve In the preferred embodiment two sieves are employed with mesh openings of 1.41 mm (No. 14 Mesh) and 0.841 mm (No. 20 Mesh). It has been found that the particles passing 14 mesh and retained on 20 mesh in wet stage mostly consist of PF/PD/RD fraction, that when dried, is suitable for tea bag. It has also been found that such fraction accounts to around 28–31% of the total Tea particles classified depending upon the moisture content in the leaf and nature of leaf. This fraction is processed separately to get a Black Tea that can be brewed in cold water as described above. The rest of Tea particles are processed conventionally without further treatment to get Black Tea.

It may be necessary to grade the Black Tea manufactured for Tea bag again to ensure that only those particles most suitable for tea bag format are only present.

Fermentation

During fermentation, the polyphenols (catechins) present in tea particles are oxidized. This oxidation process turns the green tea particles into brown during fermentation and to black tea particles after drying. During the fermentation step, the catechins present within the tea particles undergo an enzyme mediated air oxidation to form colored compounds. These compounds are Theaflavins (TFs) and Thearubigins (TRs). The TFs and TRs give the resulting tea liquor its characteristic color and flavor. That is the TFs are orange yellow in color and the TRs are reddish brown and both impart a combination of similar colors to the resulting tea liquor. While TFs are responsible for the briskness and brightness of the tea liquor, the color and strength is provided by TRs.

Addition of Tea Extract

The next step of the process occurs towards the end of the fermentation step after the tea particles have undergone partial fermentation. In this step the partially fermented particles are mixed with a tea extract solution. In the preferred embodiment, the solution is applied in a fine spray. This tea extract solution consists of between 30 to 35% (w/v) of cold water soluble tea solids. Through the addition of the solution, approximately 10% more tea solids, by weight, are added to the partially fermented tea particles. The manner in which this cold water soluble tea extract solution is produced is described in fuller detail hereinafter. It is this incorporation of the cold water soluble tea extract that permits the resulting black tea particles to be brewed in cold water, and the development of unique tea character when brewed. The tea extract solution is added during fermentation, which is at a wet stage, to permit the tea particles to absorb the tea extract and permeation of the extract into the tea particle matrix. After the extract solution is applied to the dhools a thorough mixing is achieved. The result is a wet homogenous mixture of black tea particles with cold water soluble tea solids.

Drying and Grading

The resulting tea particle are then dried to achieve a 2 to 3% moisture level at about 130 Deg. C. In the preferred embodiment this drying step is carried out in a vibro fluid bed drier. This drying stage is necessary to arrest fermentation and to make tea particles dry so that it can be stored.

Dried Tea particles are then graded based on their sizes. Mesh openings ranging from 0.42 millimeters to 2.38 millimeters are generally used for grading. The following chart illustrates the number of sieves used and their respective mesh openings. This is an indicative list of sieves generally used for grading of bulk tea after drying, and varies from country to country.

| Mesh No. | Mesh Opening, mm |
|---|---|
| 8 | 2.38 |
| 10 | 2.00 |
| 12 | 1.68 |
| 16 | 1.19 |
| 20 | 0.841 |
| 24 | 0.773 |
| 30 | 0.595 |
| 40 | 0.420 |

As a result of successively passing the tea particles through finer and finer mesh openings the above grades can be obtained. An indicative list of grades obtainable using the above sieves and their particle sizes are given below:

| Grade | Description | Particle size between |
|---|---|---|
| FP | Flowery Pekoe | 2.00–2.38 mm |
| BP | Broken Pekoe | 1.68–2.00 mm |
| BOP | Broken Orange Pekoe | 1.19–1.68 mm |
| PF | Pekoe Fannings | 0.841–1.19 mm |
| PD | Pekoe Dust | 0.773–0.841 mm |
| RD | Red Dust | 0.595–0.773 mm |
| FD | Fine Dust | 0.420–0.595 mm |
| SFD | Super Fine Dust | <0.420 mm |

Thus, the sieves permit classification of a number of different leaf grades: FP, BP, BOP (Brokens); and PF (Fannings). Furthermore, the following Dust (or Fines) grades are also classified: PD, RD, FD, SFD.

Preparation of Tea Extract

Figure 2:
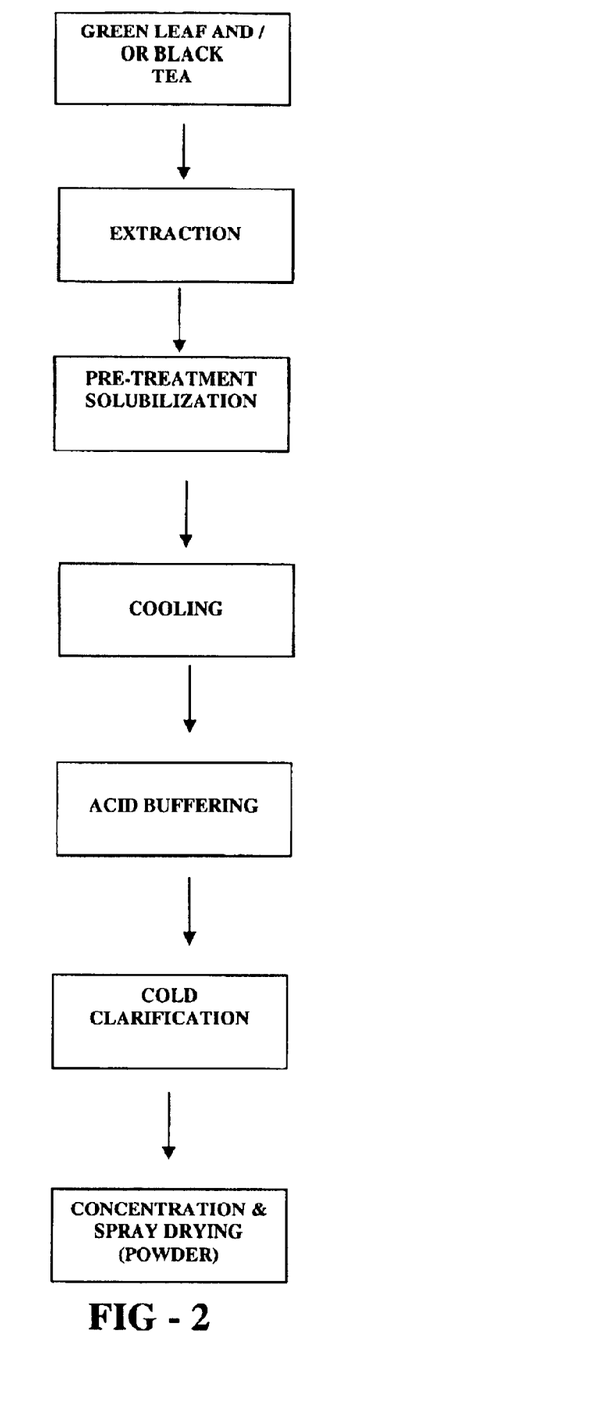
FIG. 2 is a flow chart illustrating the broad steps employed in creating the water soluble tea extract solution employed in the present invention.
Figure 3:
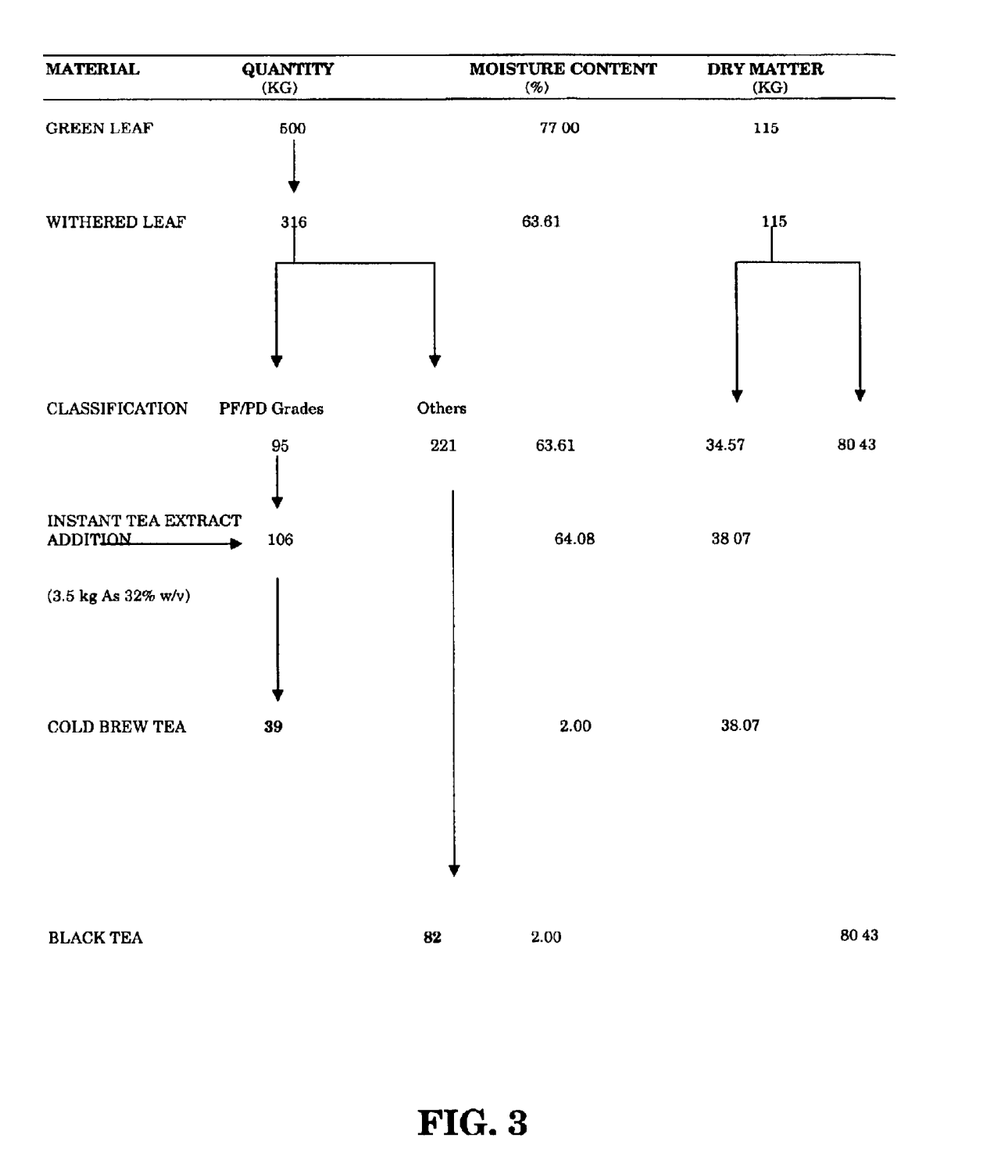
FIG. 3 is a flow chart and a typical material balance of the entire method of the present invention.

The above described cold water soluble tea extract is especially manufactured for the purposes of the present invention and is added in the required amounts during the fermentation stage. Such cold water soluble tea extract can be manufactured using any one of the known arts. One such known art method involves adding alkali and peroxide as shown in FIG. 2.

The peroxide treatment after alkali addition is to facilitate the generation of color. The depth and the extent of color generated depend on the initial pH, quantity of peroxide used, temperature of reaction, duration of treatment, final buffering pH. The required specifications for cold soluble powders can be fixed according to the final requirement of color characteristics. Such custom made powders can be procured also from factories manufacturing instant tea. The specification of the tea powder/extract used in the present invention is as follows: Color (absorbance at 560 nm) of 0.43% aqueous solution—1.00 to 1.30; pH of 0.43% solution—6.50 to 7.50.

EXAMPLES OF THE PRESENT INVENTION

Typical examples of the present invention with process details are given below:

Example 1: Cold Brew Tea - All Grades

Green Leaf: 500 Kg
Green Leaf Moisture content: 78%

-continued

Example 1: Cold Brew Tea - All Grades

| | |
|---|---|
| Dry Matter content: | 110 Kg |
| Withered Leaf: | 289 Kg (Moisture content - 61.9%, Dry Matter - 110 Kg) |
| Quantity of Tea Solid added as Tea Extract: | 11 Kg |
| Total Quantity of Product: | 124 Kg (Moisture content - 2.42%, Dry matter - 121 Kg)) |

Example 2: Selective Grades of Cold Brew Tea

| | |
|---|---|
| Green Leaf: | 500 Kg |
| Green Leaf Moisture content: | 77% |
| Dry Matter content: | 115 Kg |
| Withered Leaf: | 316 Kg (Moisture content 63.61%) |
| Wet Dhool classification: | |
| Quantity of PF/PD/RD separated: | 95 Kg (30% separation, Dry Matter - 34.57 Kg) |
| Quantity of Tea Solid added as Tea Extract: | 3.5 Kg |
| Quantity of Cold Brew Tea Product consisting of grades PF/PD/RD: | 38.85 Kg (Moisture content - 2 %, Dry Matter 38.07 Kg) |
| Quantity of dhool other than PF/PD/RD: | 221 Kg |
| Quantity of Normal Tea: | 82.06 Kg (Moisture content 2%, Dry Matter - 80.43 Kg) |

The present invention can also be employed in producing high polyphenol teas. To supplement the existing polyphenols, custom-made whole tea extract (with increased amounts of polyphenols) is added in the required amounts during fermentation. The following is an example of a high polyphenol tea:

Example 3: High Polyphenol Cold Brew Tea - All Grades

| | |
|---|---|
| Green Leaf: | 500 Kg |
| Green Leaf Moisture content: | 76% |
| Dry Matter content: | 120 Kg |
| Withered Leaf: | 333 Kg (Moisture content - 63.96%) |
| Quantity of Tea Solid added as Tea Extract: | 30 Kg |
| Total Quantity of Product: | 154 Kg (moisture content - 2.6%, Dry Matter - 150 Kg) |
| Polyphenol content of base tea: | 19% |
| Polyphenol content of tea extract added: | 30% |
| Polyphenol content of the final product: | 21.2% % (11.6% increase) |

Figure 6:
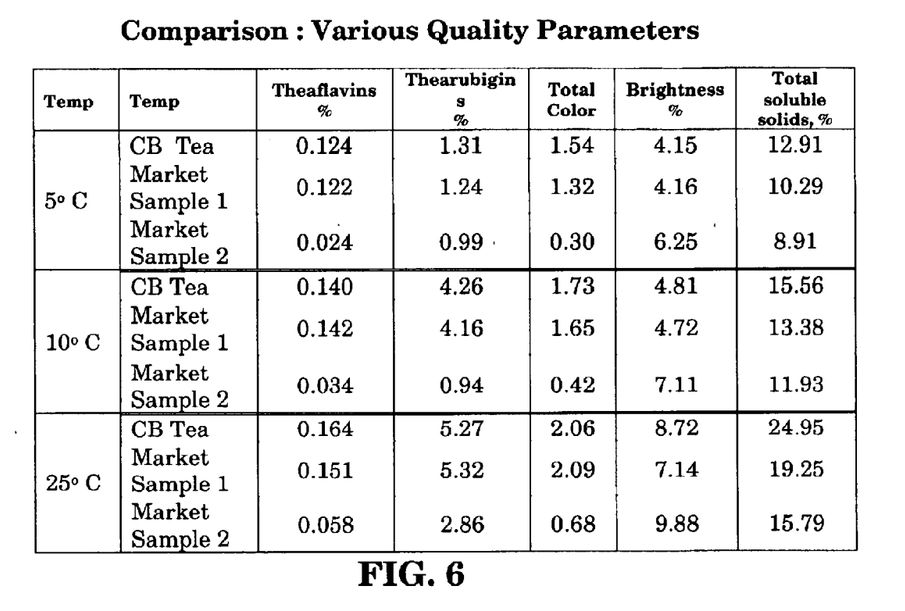
FIG. 6 is a table demonstrating the beneficial characteristics of tea leaves made in accordance with the present invention.

Characteristics of Beverages Made with Black Tea Leaves of the Present Invention The Black Tea that can be brewed in cold water manufactured by the present invention was compared to commercially available products. The products were brewed at three different temperatures and the liquor was analyzed for quality parameters. The conditions of brewing were 2.4 g in 100 ml raw water for 5 minutes at three different temperatures (5, 10, 25 Deg C.). The results are given in FIG. 6. It shows that the new product brewed fast in cold water to give a liquor with enhanced color properties, acceptable flavor and tea characters and mouth feel.

Figure 7:
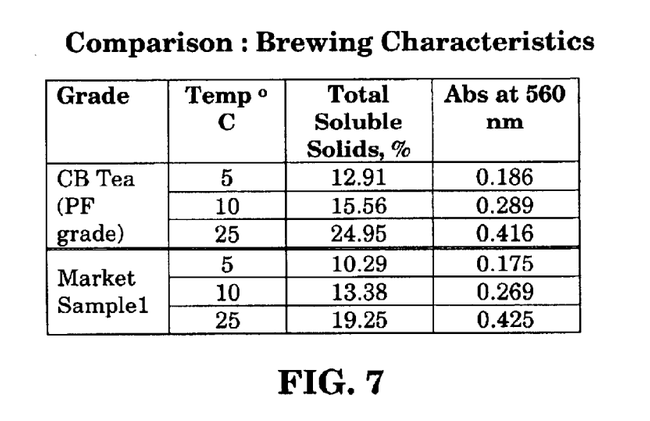
FIG. 7 is a table demonstrating the beneficial characteristics of tea leaves made in accordance with the present invention.

The total soluble solids and absorbance at 560 nm (wherein absorbance is an indication of the extent of brewing and depth and development of color) were measured for the PF grade of the product and compared with another commercially available product. It was found that the total soluble solids and the absorbance at 560 nm are high for the new product. The details are given in FIG. 7.

Figure 8:
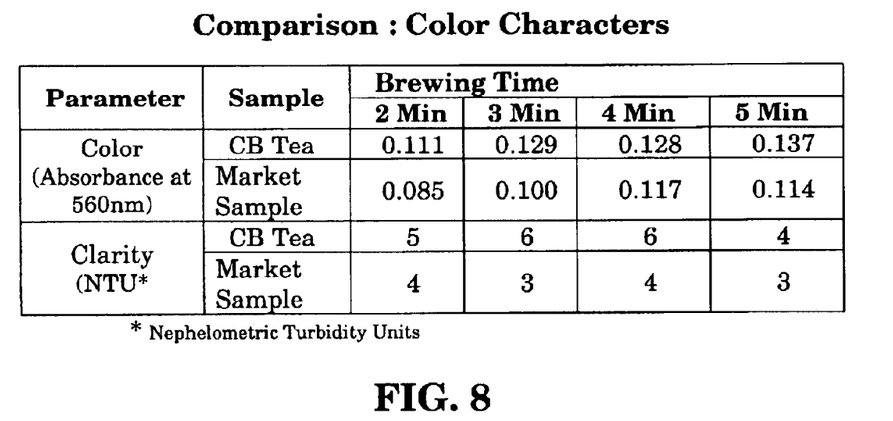
FIG. 8 is a table demonstrating the beneficial characteristics of tea leaves accordance with the present invention.

The PF grade from the present invention was next brewed for various time intervals (2.4 gm in 300 ml) and the color and clarity were measured. The values were compared with a commercially available tea product. The details are given in FIG. 8. The results indicate that tea made with tea leaves of the present invention has superior color and clarity (as measured in Nephelometric Turbidity Units).

Figure 4:
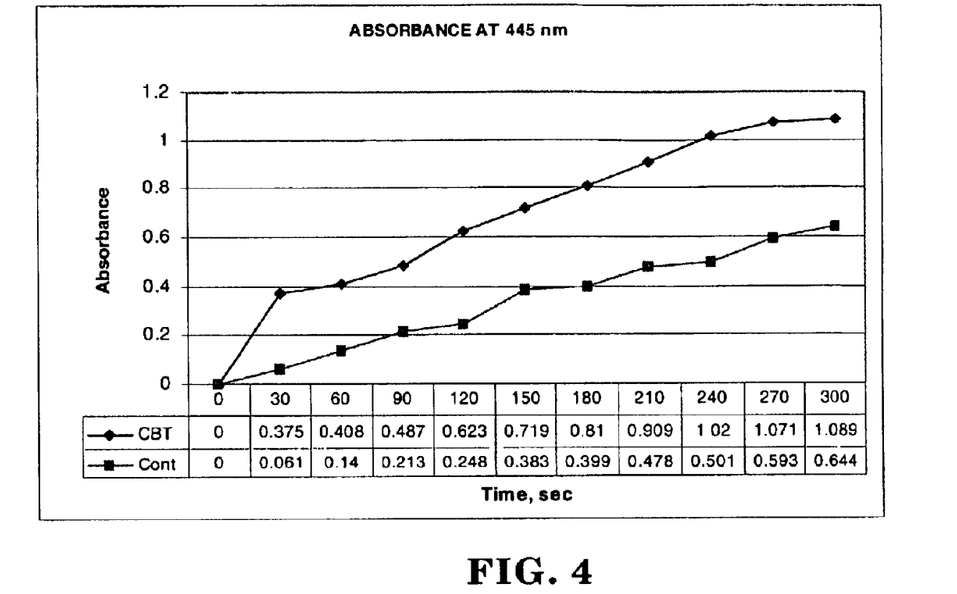
FIG. 4 is a graph plotting absorbance at 445 nm versus time and demonstrates the cold brewing capacity of leaves made by way of the present invention.
Figure 5:
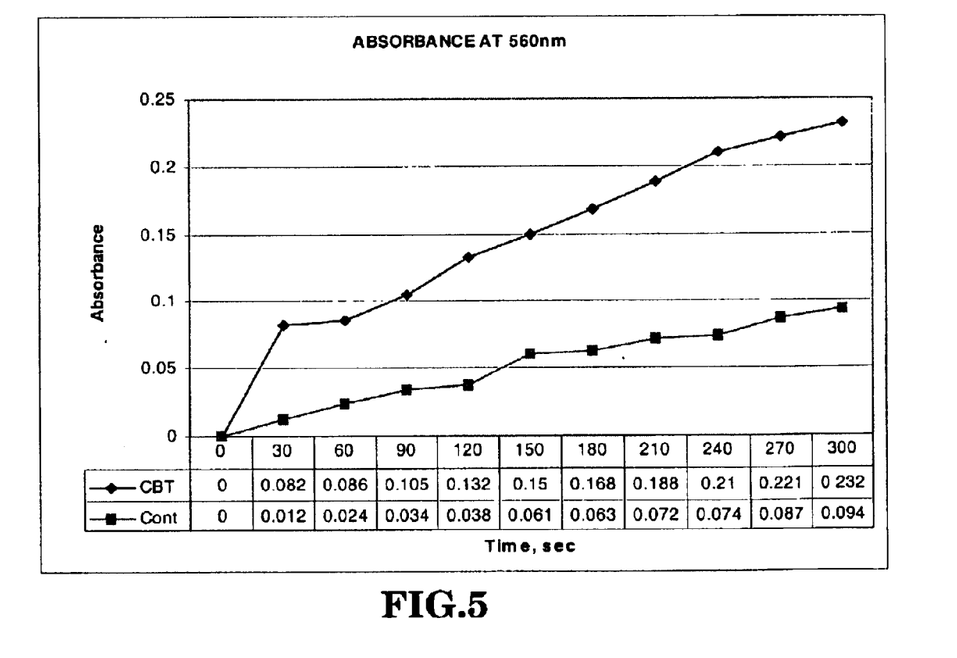
FIG. 5 is a graph plotting absorbance at 560 nm versus time and demonstrates the cold brewing capacity of leaves made by way of the present invention.

Next, the PF grade from the present invention and a control were brewed in cold water at 20 deg C. and the color of the brew was measured at 30 sec intervals at 445 nm and 560 nm wavelengths. The plots reveal that the brewing and color development was much faster in the case of the cold brew product (CBT) made in accordance with the present invention. The control product developed color more slowly. The plots are given in FIGS. 4 & 5.

Figure 9:
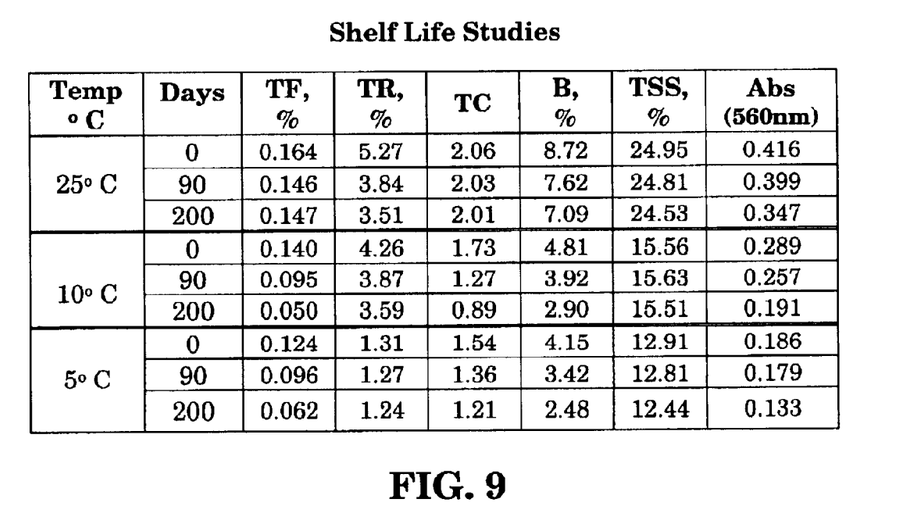
FIG. 9 is a table demonstrating the shelf life qualities of tea leaves made in accordance with the present invention Similar reference characters refer to similar parts throughout the several views of the drawings.

Shelf Life studies were carried out with the PF grade of the tea from the present invention. The product was evaluated after the $90^{th}$ and $200^{th}$ day. Though chemical analysis showed drop in values of some characteristics, taster's evaluation showed that there is no appreciable quality deterioration. The details of the analysis are given in FIG. 9. In FIG. 9, TF refers to Theaflavins; TR refers to Thearubigins; TC refers to Total Color; B refers to Brightness; and TSS refers to Total Soluble Solids.

Terminology

The term 'green tea leaves' refers to the mature two or three leaf and a bud harvested from the species *Camellia sinensis* and covers Assam type, China type and all hybrids including Combod varieties. The term 'Tea' refers to either the tea plant or the product (black tea) manufactured from the tea leaves harvested, by the conventional method of manufacture. The term 'Made Tea' is used to mean the manufactured black tea. The term 'Tea Extract' means either the tea powder, liquid concentrate, or reconstituted tea powder which are either hot or cold water soluble. The 'liquid concentrate' can be either the concentrate reconstituted from the tea powder or the concentrate prior to spray drying. Unless otherwise stated, all analysis was carried out with combined PF/PD/RD grades. 'Cold brewing tea' or 'tea that can be brewed in cold water' means the black tea that can brew in cold water, but not below 5 deg. C., to give a brew with acceptable color, strength and other tea characters.

All the chemical analyses were carried out using the standard methods of analysis. Total Polyphenol assay was carried out according to the method of Folin—Ciocalteau. A Double beam UV-Vis Spectrophotometer and Turbidimeter were used for measuring the absorbance and NTU values respectively and other analytical measurements.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:
1. A method of processing tea leaves to produce black tea that can be brewed in cold water, the method comprising the following steps:

withering green tea leaves by spreading out the leaves and promoting air circulation, the withering functioning to reduce the moisture content within the leaves to produce withered leaves;

macerating the leaves to break down the tissue structure of the leaves and thereby facilitating oxidation of polyphenols by bringing the polyphenols into contact with leaf enzymes, the maceration producing dhools of varying grades;

fermenting the dhools;

spraying the fermented dhools with a tea extract solution, the extract solution consisting of a solution of specially made cold water soluble tea extract;

drying the tea dhools, the drying lowering the moisture content and ceasing the oxidation of the polyphenols by leaf enzymes and producing black tea which can be brewed in cold water.

2. A method of processing green tea leaves to produce black tea that can be brewed in cold water more specifically suitable for use within a tea bag, the method comprising the following steps:

withering green tea leaves by spreading out the leaves and promoting air circulation, the withering functioning to reduce the moisture content within the leaves to produce withered leaves;

macerating the withered leaves, the macerating being accomplished by a CTC machine and functioning to break down the tissue structure of the leaves to thereby bringing into contact the leaf enzymes with green leaf polyphenols, the maceration producing dhools of varying grades;

classifying the resulting dhools by way of a sieve, selecting those dhools most suitable for use within a tea bag;

partially fermenting the selected dhools, the fermentation involving the oxidization of the polyphenols by leaf enzymes to thereby create Teaflavins and Thearubigins;

spraying the partially fermented dhools with a specially made tea extract solution, the extract solution consisting of a solution of between 30–35% (w/v) cold water soluble tea extract;

continued fermentation to complete oxidization of the leaf polyphenols with leaf enzymes, the continued fermentation producing brown tea dhools;

drying the brown tea dhools, the drying lowering the moisture content and ceasing the oxidation of the polyphenols by leaf enzymes and producing a Black Tea that can be brewed in cold water suitable for use within a tea bag.

3. The method as described in claim 1 wherein the dhools are partially fermented prior to spraying them with the tea extract solution.

4. The method as described in claim 1 wherein the maceration is carried out by a CTC machine.

5. The method as described in claim 1 wherein the tea extract solution consists of a solution of between 30–35% (w/v) specially made cold water soluble tea extract.

6. The method according to claim 2 wherein the classification can be carried out using suitable sieves to separate any desired grade for manufacture into Black Tea that can be brewed in cold water and the rest into Black Tea.

7. The method as described in claims 2 wherein the classification is carried out by a double stage sieve using Mesh No. 20 & 14 to get grades suitable for tea bags.

8. The method as described in claim 2 wherein the classification is carried out in a continuous rotary sieve using a No. 20 and 14 Meshes in series to get grades suitable for tea bags.

9. The method as described in claim 2 wherein the dhools selected for use in a tea bag include Pekoe Fannings, Pekos Dust and Red Dust.

10. The method as described in claim 2 wherein after the dhools are sprayed with the tea extract, the dhools and tea extract are mixed.

11. The method as described in claim 2 wherein the dhools are sprayed with the tea extract having the following specification—Color (absorbance at 560 nm) of 0.43% aqueous solution—1.00 to 1.30; pH of 0.43% solution—6.50 to 7.50.

12. A method of processing tea leaves to produce black tea that can be brewed in cold water, the method comprising the following steps:

withering green tea leaves by spreading out the leaves and promoting air circulation, the withering functioning to reduce the moisture content within the leaves to produce withered leaves;

macerating the leaves to producing dhools of varying grades;

classifying the dhools and selecting those dhools most suitable for use within a tea bag;

processing rest of the dhools into conventional black tea;

fermenting the selected dhools;

spraying the selected, partially fermented dhools with a tea extract solution, the extract solution consisting of a solution of cold water soluble tea extract completing fermention of the selected dhools, drying the dhools and grading if necessary.

13. A method of processing tea leaves to produce high polyphenol black tea that can be brewed in cold water comprising of the following steps:

withering green tea leaves by spreading out the leaves and promoting air circulation, the withering functioning to reduce the moisture content within the leaves to produce withered leaves;

macerating the leaves to break down the tissue structure of the leaves and thereby bringing into contact leaf enzymes and polyphenols to facilitate air oxidation, the maceration producing dhools of varying grades;

partially fermenting the dhools;

spraying the partially fermented dhools with a high polyphenol whole tea extract solution, the extract solution consisting of a solution of cold water soluble tea extract;

drying the tea dhools, the drying lowering the moisture content and ceasing the oxidation of the polyphenols with leaf enzymes and producing high polyphenol tea that can be brewed in cold water, suitable for use within a tea bag or as a bulk tea.

* * * * *